Nov. 16, 1948.  L. H. BROWN  2,453,697
GUN SIGHT HAVING A PLURALITY OF ILLUMINATED RETICLES
Filed March 17, 1944  2 Sheets-Sheet 2
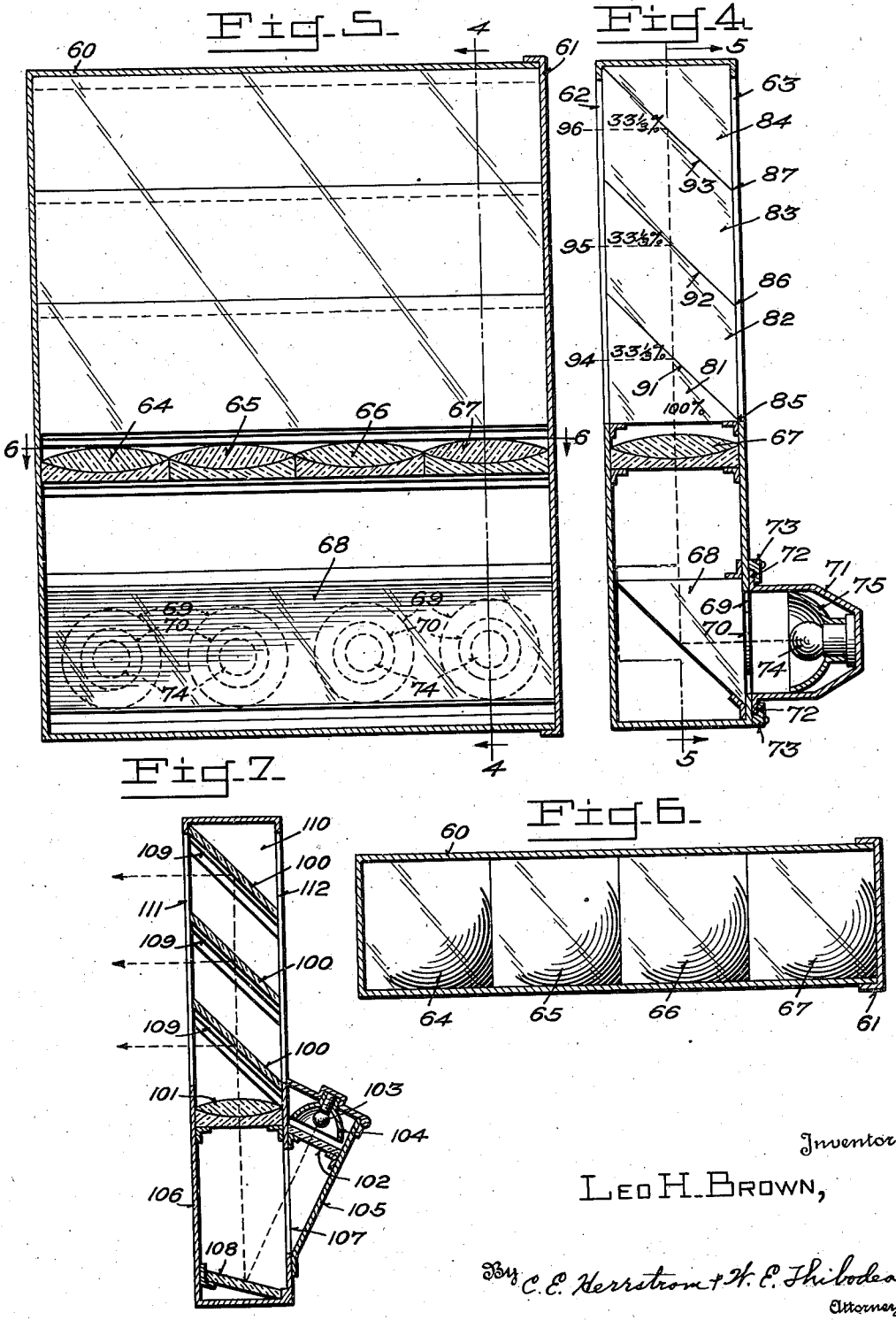
Inventor
Leo H. Brown,
By C. E. Herrstrom + W. E. Thibodeau
Attorneys Patented Nov. 16, 1948

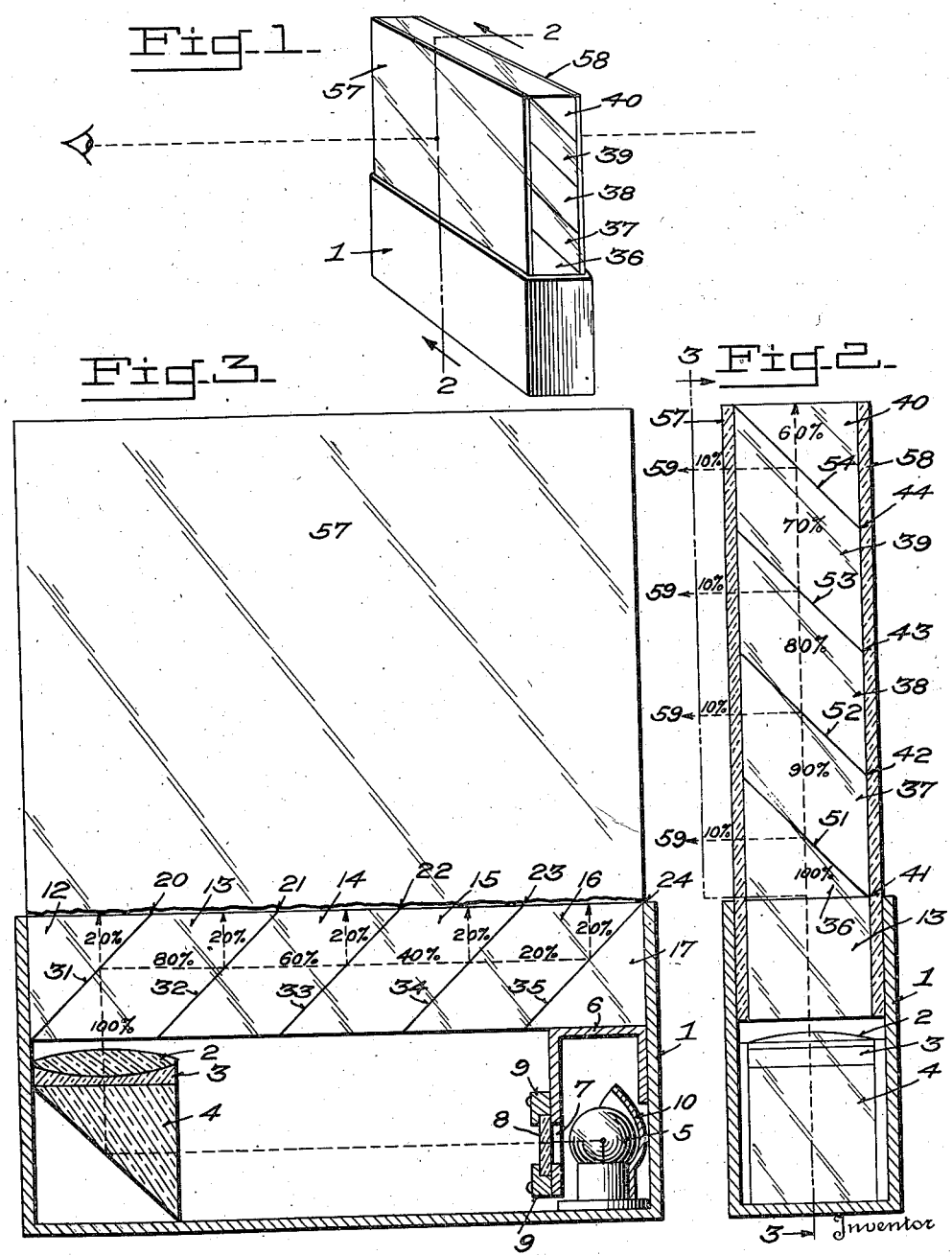

2,453,697

UNITED STATES PATENT OFFICE 2,453,697

GUN SIGHT HAVING A PLURALITY OF ILLUMINATED RETICLES

Leo H. Brown, Glenville, Conn.

Application March 17, 1944, Serial No. 526,956

2 Claims. (Cl. 88—2.3)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to sights for guns.

Among the objects of the invention is the provision of a reflector sight in which a large exit pupil may be obtained with a collimating lens or lens system of small aperture.

Another object of the invention is to provide a reflex sight whose exit pupil is many times the area of the aperture of the collimating lens or collimating lens system, or many times the area of that part of the collimating lens or lens system through which light from the reticle is allowed to pass.

Still another object of the invention is the provision of a collimator gun sight which avoids the necessity of using large collimating lenses to obtain a large exit pupil or field of observation.

A further object of the invention is the provision of a reflecting collimator sight for guns which is compact in construction, and which may be symmetrical with reference to three axes at right angles to each other.

A further object of the invention is to provide means for apportioning a quantity of light over an area in several steps, without dispersion or substantial dispersion thereof.

Other objects will be appreciated from the detailed description below of embodiments of the invention.

In the accompanying drawings which illustrate several examples of gun sights constructed in accordance with the present invention:

Figure 1 shows in perspective the external appearance of one modification of the gun sight and how it is used in sighting on a target.

Figure 2 is a vertical cross section of the gun sight on the line 2—2 of Figure 1 with certain of the parts in elevation.

Figure 3 is a view partly in front elevation and partly in section on the line 3—3 of Figure 2.

Figure 4 is a cross section similar to Figure 2 of another modification of the invention and taken on the line 4—4 of Figure 5.

Figure 5 is a vertical section take on the line 5—5 of Figure 4.

Figure 6 is a horizontal section taken on the line 6—6 of Figure 5.

Figure 7 is a cross section similar to Figure 2 of still another modification of the invention.

Referring specifically to the modification illustrated in Figures 1, 2, and 3 of the drawings, numeral 1 indicates a casing which is rectangular in cross section, and in which the collimating lenses 2, 3, reflecting prism 4, electric light bulb 5, and light bulb housing 6 are mounted. Electric bulb 5 is enclosed within the housing 6 provided with an aperture 7 over which is placed the slide 8, which is carried in guides 9, 9 secured to the housing 6. A reticle is placed upon the slide 8 for illumination by light from the light bulb 5. The housing 6 is secured to the casing 1 in any suitable way, and preferably detachably. A reflector 10 is so disposed in relation to the light bulb that light emitted by the bulb is directed towards the reticle on slide 8. Slide 8 is removable from the guides 9 to enable replacement or substitution of reticles.

Above the collimating lenses 2, 3 and the housing 6 is placed a row of glass prisms 12, 13, 14, 15, 16, and 17. Prisms 12 and 17 are triangular prisms and 13, 14, 15, and 16 are parallelepipedons. These prisms serially abut one against the other and are so shaped as to provide planes or interfaces of abutment 20, 21, 22, 23, and 24 that are inclined at substantially 45° to the longitudinal axis of the row of prisms. On one of the abutting surfaces of each pair of abutting prisms, except the pair consisting of prisms 16 and 17, is formed a mirror of silver or of aluminum which partially transmits light and partially reflects light, in degrees or percentages described more in detail hereinafter. A full or opaque mirror is, however, formed on one of the abutting surfaces of 16 and 17 forming the interface 24. The prisms 12, 13, 14, 15, 16, and 17, after the formation of said mirrors, are cemented together with Canada balsam, so that there is a partially silvered mirror at each of the interfaces 20, 21, 22, and 23, and a fully silvered mirror at interface 24. These mirrors which are parallel and inclined at 45° to the optical or longitudinal axis of the assembly are designated as mirrors 31, 32, 33, 34 and 35.

Directly above the prisms 12, 13, 14, 15, and 16 is positioned a column or row of prisms 36, 37, 38, 39 and 40 which abut one against the other to provide parallel and inclined planes or interfaces 41, 42, 43 and 44. Prisms 36 and 40 are triangular prisms, while prisms 37, 38 and 39 parallelepipedons. These prisms are provided between their abutting surfaces, on one surface of each pair of abutting surfaces, with a mirror of silver or of aluminum which partially transmits and partially reflects light, each to the extent hereinafter described. The prisms, after silvering, are cemented together with Canada balsam. The inclination of the abutting faces or mirrors is such as to form an angle of 45° with the optical axis of the column or row. For the purposes of reference these mirror surfaces are indicated by numerals 51, 52, 53 and 54.

At one side of the column of prisms 36, 37, 38, 39 and 40, is positioned a transparent glass plate 57 and a similar plate 58 is positioned on the opposite side of the said column. The said glass plates extend into the casing 1 and also comprised between them are prisms 12, 13, 14, 15, 16 and 17. The plates 57 and 58 are cemented with Canada balsam to prisms 36, 37, 38, 39, and 40 and to prisms 12, 13, 14, 15, 16, and 17, whereby the said prisms and the said plates constitute a unit which is insertable in casing 1 above the collimating lenses 2 and 3 and lamp housing 6.

Collimating lenses 2 and 3 and prism 4 are seccured in casing 1 below the prism 13, so that the light emerging from the lenses 2 and 3 is incident upon the first partial mirror 31.

Slide 8 and the reticle thereon is so positioned with relation to the collimating lenses 2 and 3 that the length of the optical path from the reticle to the collimating lenses is equal to the focal length of the lens combination consisting of lenses 2 and 3, whereby the light rays from the reticle after emerging from the collimating lenses are substantially parallel.

As appears in Figure 3, reflecting prism 4 is so positioned that light from the reticle or slide 8 is reflected into the collimating lenses, or lens combination.

The characteristics of the various mirrors which partially reflect and partially transmit light are now described. The total quantity of the light emerging from the collimating lenses is taken at 100%. Mirror 31 is so partially silvered as to transmit 20% of this total upwardy to prism 12, whence it emerges and enters into prism 36. The remaining 80% is reflected towards the mirror 32 which is so silvered as to reflect 25% thereof, or 20% of the original light, upwardly into prism 36. The 60% of the original light which remains is transmitted to mirror 33 which is so silvered as to reflect 33⅓% of the said 60%, or 20% of the original light, upwardly into prism 36 and to permit 40% of the original light to be transmitted to mirror 34. Mirror 34, in turn, is so silvered that it reflects 50% of the light incident thereon, or 20% of the original light, upwardly into prism 36. The remaining 20% of the original light which is transmitted through mirror 34 proceeds to mirror 35 from which 100% of it, or 20% of the original light, is reflected upwardly into prism 36. The mirror 36 is, therefore, a fully silvered mirror.

It is to be noted that each of the five mirrors 31, 32, 33, 34 and 35 is so silvered as to direct upwardly into prism 36, 20% of the 100% of light emerging from the collimating lenses 2 and 3. In this manner the parallel rays of light which diverged from the reticle are uniformly apportioned along the length of prism 36 and apportioned uniformly on mirror 51. Thus, the five inclined mirrors 31, 32, 33, 34, and 35 constitute means for apportioning a given quantity of light uniformly over an area, such as a reflecting surface 36, without the occurrence or substantial occurrence of dispersion. This apportionment of the light may be considered as first occurring over a plane intersecting the planes of mirrors 31, 32, 33, 34 and 35 at an angle at 45°.

The sum of five 20% portions of the original light incident upon mirror 51 now make up the 100% quantity of light which emerges from the collimating lenses 2 and 3, neglecting, for the purpose of simplifying the description, absorption or losses which may have occurred.

Now mirrors or mirror surfaces 51, 52, 53 and 54 are so silvered as to partially reflect and partially transmit light incident thereon. Mirrors 51, 52, 53, and 54 are each so silvered as to reflect a fraction of the total light entering prism 36 and to transmit the remainder. Such a reflected portion may be, for example 10% of the quantity of light entering prism 36. Thus, when said 10% is reflected by each mirror, each of said four mirrors must reflect respectively 10%, 11.1%, 12.5% and 14.3% of the percentage of the original light incident thereon. Thus inclined mirrors 51, 52, 53 and 54 constitute means for apportioning a quantity of light without dispersion or substantial dispersion, over a plane, represented by the plane of plate 57 which is at an angle of 45° with the planes of the mirrors 51, 52, 53 and 54 in the illustrated embodiment of the invention.

The 60% of the total of the light which enters prism 36, which is not reflected by mirrors 51, 52, 53 and 54 is transmitted upwardly out of the prism 49 or absorbed in a black coating applied to the top thereof.

The silver or aluminum coatings of mirrors 51, 52, 53 and 54 must be thin enough to enable the target to be seen therethrough when looking through the device as shown in Figure 1 when the plate 57 faces the observer.

*Operation.*—The broken lines with arrow heads applied thereto indicate the path and apportionment of a pencil of light rays starting at the reticle on slide 8, and which enters collimating lens combination 2, 3, symmetrically with respect to the principal axis of the said collimating lens combination. The pencil after passage through the collimating lens combination is constituted of parallel rays of light. The parallel rays are first incident upon the mirror 31, and thereafter subsequently pass through each of partial mirrors 32, 33 and 34 and finally on to full mirror 35. At mirror 31, 20% of the total quantity of the light in the pencil is transmitted upwardly into prism 12 and then into prism 36, and at each of mirrors 32, 33, 34 and 35, 20% of the total quantity of light in the original pencil is apportioned and reflected upwardly into prism 36.

The light which emerged from the collimating lens combination 2, 3 has now been spread out and apportioned uniformly in a direction parallel to its direction of propagation. The light now proceeds in succession to and through mirrors 51, 52, 53 and 54 which each apportion it by partial reflection and partial transmission, so that the light now becomes spread out and apportioned as indicated by the arrow heads 59 in Figure 2 in a direction at right angles to the direction in which it was spread out by mirrors 31, 32, 33, 34 and 35, or over an area, for example, on the plane of plate 57, forming an angle of 45° with the planes of mirrors 51, 52, 53 and 54.

Referring now specifically to the modification illustrated in Figures 4, 5 and 6, the numeral 60 indicates a casing in which the various prisms and lenses are assembled. This casing is provided with a removable cover portion 61 at one end to permit insertion of the various elements within the casing. The upper part of the casing is open at both sides to provide opposite windows 62 and 63.

A number of square converging collimating lenses are arranged in a row across the casing 60. Four of such lenses are illustrated in Figure 5 and indicated therein by numerals 64, 65, 66 and 67. These lenses are positioned in the casing 60 below the windows 62 and 63 and are held therein in any suitable manner. The converging lenses are contiguous and substantially in the same plane, with their principal axes substantially parallel.

A triangular reflecting prism 68 is secured in any suitable manner in the casing 60 below the lenses 64, 65, 66 and 67, and the reflecting surface of said prism is of sufficient extent to reflect light incident thereon to all four of said lenses. Prism 68 is advantageously located near the bottom of casing 60 and is secured over four openings 69 therein. The distance between the centers of these openings is equal to the distance between the centers of the four collimating lenses, whereby an opening corresponding to each lens is provided.

Four reticle plates 70 are cemented with Canada balsam on the face of prism 68 that covers the openings 69, each plate being cemented on said face to register with one of said openings. Each plate 70 carries a reticle, each reticle being so located that light from the center thereof enters its corresponding collimating lens substantially along its principal axis. The reticles preferably lie in the interface formed by each plate 70 and prism 68.

A light housing 71 covers the openings 69 as shown in Figure 4, and is provided with flanges 72 which engage and slide in guides 73 to enable the light housing to be removed from casing 60, whereby solar light may be used to illuminate the reticles on reticle plates 70, when it is possible to employ this form of illumination.

Light housing 71 carries four electric light bulbs 74 which register with the four openings 69. A reflector 75 is provided for each light bulb. These lights provide illumination for the reticles on plates 70 when solar or daylight illumination is not used.

Four or more glass prisms 81, 82, 83 and 84 extend across the casing 60 above the four collimating lenses 64, 65, 66 and 67 and are arranged as a column or row in the same way that the prisms 36, 37, 38, 39 and 40 are arranged in the modification illustrated in Figures 1, 2 and 3. They are cemented together in the same way as the latter and in the interfaces 85, 86, 87 are provided mirror coatings or surfaces which both reflect and transmit light. These mirrors are indicated by the numerals 91, 92, and 93. However, in the modification of the invention illustrated in Figures 4, 5 and 6, the coatings of silver or aluminum have been so applied to the prisms as to give percentages of light reflectance and light transmission which are different from those given in connection with the modification illustrated in Figures 1, 2 and 3. Thus, in the modification illustrated in Figures 4, 5 and 6, there are three inclined reflecting mirrors 91, 92 and 93 with the following light reflecting and light transmitting characteristics: mirror 91 reflects 33⅓% and transmits 66⅔% of the light incident thereon; mirror 92 reflects 50% and transmits 50% of the light incident thereon; and mirror 93 reflects 100% and transmits zero percent of the light incident thereon. Therefore, taking the light which enters prism 81 as 100%, 33⅓% of it is reflected at each of mirrors 91, 92 and 93, as indicated by the dotted lines 94, 95, and 96. These mirrors are inclined in the same way and to the same extent as the mirrors in the modification illustrated in Figures 1, 2, and 3.

The length of the optical path from each reticle on the reticle plates 70 to the collimating lenses 64, 65, 66, and 67 is equal to the focal length of these lenses, whereby the light rays which proceed from the reticles to the said lenses emerge substantially parallel from the latter.

In the modification of the invention illustrated in Figure 7 the simultaneously light transmitting and light reflecting mirrors are carried on inclined glass plates 100 instead of being positioned in interfaces between prisms as in Figure 4. A plurality of collimating lenses is also employed as in the modification illustrated in Figures, 4, 5 and 6, one of the lenses being indicated by the numeral 101 in Figure 7. A reticle is located on reticle plate 102 which is illuminated by an electric light 103 provided with reflector 104. The reticle plate 102, light 103 and reflector 104 are contained within a housing 105 secured to casing 106. Casing 106 corresponds to casing 60 of the modification illustrated in Figures 4, 5 and 6, and housing 105 covers the opening 107 in the wall of said casing through which light passes from the reticle on plate 102 to inclined mirror 108 at the bottom of casing 106. There is a light and reticle for each collimating lens 101. The inclination of the mirrors on inclined plates is the same as in the other modifications described above. Plates 100 are secured on brackets 109 carried on each end 110 of casing 106. Windows 111 and 112 are provided in the casing 106 above the collimating lenses, and correspond to windows 62 and 63 of the modification illustrated in Figures 4, 5 and 6.

In the modifications illustrated in Figures 4 to 7 inclusive, light proceeds from the reticles to the collimating lenses and then to the inclined simultaneously light transmitting and light reflecting surfaces 91, 92 and 93 (of the modification illustrated in Figures 4, 5 and 6) and to the simultaneously light transmitting and reflecting surfaces on plates 100 (of the modification illustrated in Figure 7).

I claim:

1. In a gun sight, a reticle, collimating means for rays of light from said reticle, a plurality of prisms arranged in a row in abutting relationship to provide a plurality of pairs of abutting surfaces inclined at substantially forty-five degrees to the longitudinal axis of the row, a mirror surface which partially transmits and partially reflects light positioned between each of said pairs of abutting surfaces, said collimating means being so disposed with relation to the first of said mirror surfaces that axial light rays passing from said collimating means are incident upon the first of said mirror surfaces at substantially forty-five degrees; a second plurality of prisms arranged in a row in abutting relationship also to provide a plurality of pairs of abutting surfaces inclined at substantially forty-five degrees to the longitudinal axis of the row, a mirror surface which partially transmits light and partially reflects light between each of said pairs of abutting surfaces, said second row of prisms being so positioned with respect to said first row of prisms that the mirror surfaces in said second row will receive at an angle of incidence a substantially forty-five degrees axial light rays from said collimating means reflected by the mirror surfaces in said first row of prisms.

2. In a gun sight, a reticle, collimating means for rays of light from said reticle, a plurality of parallelepipedons arranged in a row in abutting relationship to provide a plurality of pairs of abutting surfaces inclined at substantially forty-five degrees to the longitudinal axis of the row, a mirror surface which partially transmits light and partially reflects light positioned between each of said pairs of abutting surfaces, said collimating means being so disposed with relation to the first of said mirror surfaces that axial light rays passing from said collimating means are incident upon the first of said mirror surfaces at substantially forty-five degrees; a second plurality of parallelepipedons arranged in a row in abutting relationship also to provide a plurality of pairs of abutting surfaces inclined at substantially forty-five degrees to the longitudinal axis of the row, a mirror surface which partially transmits light and partially reflects light between each of said pairs of abutting surfaces, said second row of parallelepipedons being positioned with respect to said first row that the mirror surfaces in said second row will receive at an angle of incidence of substantially forty-five degrees axial light rays from said collimating means reflected by the mirror surfaces in said first row of parallelepipedons.

LEO H. BROWN.

REFERENCES CITED

The following references are of record in the file of this patent:

UNITED STATES PATENTS

| Number | Name | Date |
|---|---|---|
| 683,203 | Grubb | Sept. 24, 1901 |
| 1,319,292 | Kunz | Oct. 21, 1919 |
| 1,456,427 | Gorsky | May 22, 1923 |
| 1,519,919 | Klein | Dec. 16, 1924 |
| 1,930,498 | Wright | Oct. 17, 1933 |
| 2,053,224 | Reason | Sept. 1, 1936 |

FOREIGN PATENTS

| Number | Country | Date |
|---|---|---|
| 669,442 | France | Aug. 3, 1929 |
| 560,202 | Germany | Sept. 30, 1932 |
| 437,444 | Great Britain | Oct. 28, 1935 |
| 828,107 | France | Feb. 7, 1938 |